(12) United States Patent
Ding et al.

(10) Patent No.: US 10,853,119 B2
(45) Date of Patent: Dec. 1, 2020

(54) GIANTVM FOR RESOURCE AGGREGATION

(71) Applicant: Shanghai Jiao Tong University, Shanghai (CN)

(72) Inventors: Zhuocheng Ding, Shanghai (CN); Yubin Chen, Shanghai (CN); Jin Zhang, Shanghai (CN); Yun Wang, Shanghai (CN); Weiye Chen, Shanghai (CN); Zhengwei Qi, Shanghai (CN); Haibing Guan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 73 days.

(21) Appl. No.: 16/222,137

(22) Filed: Dec. 17, 2018

(65) Prior Publication Data

US 2020/0174817 A1 Jun. 4, 2020

(30) Foreign Application Priority Data

Nov. 29, 2018 (CN) .......................... 2018 1 1445228

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 2009/45583* (2013.01)

(58) Field of Classification Search
CPC ....... G06F 9/45558; G06F 2009/45583; G06F 9/5016
See application file for complete search history.

(56) References Cited

U.S. PATENT DOCUMENTS

| 8,307,191 B1* | 11/2012 | Jain ..................... | G06F 12/1036 711/206 |
| 2009/0113110 A1* | 4/2009 | Chen ................... | G06F 11/1484 711/6 |
| 2014/0109091 A1* | 4/2014 | Philipson ............ | G06F 9/45558 718/1 |
| 2014/0165056 A1* | 6/2014 | Ghai .................... | G06F 9/45533 718/1 |
| 2014/0245294 A1* | 8/2014 | Kaul ................... | G06F 9/45558 718/1 |
| 2014/0278496 A1* | 9/2014 | Spencer ............. | G06F 11/3442 705/2 |
| 2014/0380009 A1* | 12/2014 | Lemay ................ | G06F 9/45558 711/163 |
| 2015/0169348 A1* | 6/2015 | Chang .................. | G06F 9/3867 718/1 |
| 2017/0262347 A1* | 9/2017 | Dornemann ........ | G06F 9/45558 |

* cited by examiner

*Primary Examiner* — Tuan C Dao
(74) *Attorney, Agent, or Firm* — Anova Law Group, PLLC

(57) ABSTRACT

Described herein is a method for resource aggregation (many-to-one virtualization), comprising: virtualizing CPU by QEMU in a distributed way; organizing a plurality of memories scattered over different machines as pages to providing consistent memory view for guest OS; and performing time synchronization between different machines.

18 Claims, 6 Drawing Sheets

GIANTVM FOR RESOURCE AGGREGATION

CROSS-REFERENCES TO RELATED APPLICATIONS

This application claims priority to Chinese Patent Application No. 201811445228.6, filed on Nov. 29, 2018, the entire content of which is incorporated by reference.

TECHNICAL FIELD

This invention relates generally to the field of computer processors. More particularly, the invention relates to GiantVM for resource aggregation.

BACKGROUND

As the speed of information growth exceeds Moore's Law, we have seen a paradigm shift from scale-up to scale-out at the beginning of this century. To deal with the big data problem, data processing frameworks such as MapReduce and Spark are proposed and quickly become prevalent. Today, the conventional wisdom is that traditional scale-up solutions such as mainframes have low-cost performance ratios and cannot support the large-scale businesses of web companies.

However, evidence shows that the majority of data analytics jobs do not process huge datasets, due to the power-law distribution of job size. For the same reason, the data set of scientific computing and machine learning tasks are usually not extremely large and can be held in memory on a single scale-up machine. Further, distributed frameworks usually impose significant overhead and perform poor on single machines. This is equally true for small clusters, as shown in FIG. 1. In this simple experiment, Spark runs on two machines, each of which has 8 cores, but still cannot outperform a single machine of 8 cores running equivalent programs to Spark jobs. It can be concluded that there is a dilemma between the configuration difficulties, programming model complexities and runtime overheads of distributed frameworks and the high price of scale-up machines for those tasks whose data set is small enough to reside in a single scale-up machine but not in a commodity machine.

Parallel to the rising of big data, cloud computing has become another important trend since the 2000s. Utilizing virtualization technologies, cloud providers are able to virtualize a single physical machine into multiple virtual machines (one-to-many virtualization) to achieve simpler management and better resource utilization.

BRIEF SUMMARY

Described herein are various implementations for virtualizing multiple physical machines into one virtual machine (many-to-one virtualization) to solve the aforementioned dilemma.

In certain implementations, it provides a method for resource aggregation, comprising: virtualizing CPU by QEMU in a distributed way; organizing a plurality of memories scattered over different machines as pages to providing consistent memory view for guest OS; and performing time synchronization between different machines.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

DETAILED DESCRIPTION

Figure 1:
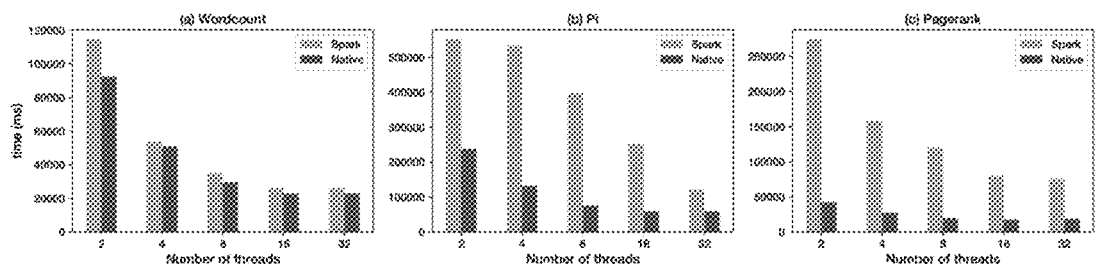
FIG. 1 shows the comparison between bare metal and Spark.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

The meaning of some expressions is explained at first.

1. System Virtualization

System virtualization refers to an abstraction layer that separates the physical hardware from operating systems to gain more flexible resource utilization, which enables multiple virtual machines to run on a single physical machine. This abstraction layer is called virtual machine monitor (VMM) or hypervisor. System virtualization is traditionally implemented purely in software, but hardware-assisted virtualization approaches have been prevalent nowadays.

CPU Virtualization

VT-x extension introduces a new mode called VMX and a series of VMX instructions. VMX mode is further divided into non-root mode and root mode, in which guest OS and hypervisor reside respectively. The transition from non-root mode to root mode is referred to as VMExit. Under non-root mode, there are some privileged instructions which will cause a VMExit when executed, and the hypervisor only needs to emulate those instructions instead of emulating each instruction.

Memory Virtualization

Traditionally, memory is virtualized through shadow page tables. Extended Page Table (EPT) is introduced which provides secondary mappings from Guest Physical Address (GPA) to Host Physical Address (HPA). Given a Guest Virtual Address (GVA), it is first translated to GPA using the conventional page table and then translated to HPA using EPT. If the translation through EPT failed (e.g., due to an invalid or read-only entry), a special VMExit called EPT violation will be triggered. Page fault is also used to refer to EPT violation in this patent.

I/O Virtualization

Traditionally, I/O devices are virtualized through the trap-and-emulate approach. Specifically, devices generally use direct memory access (DMA) to transfer data to and from memory. With IOMMU, the address used by DMAs becomes virtual address and is translated by IOMMU to physical address. With the help of IOMMU, guest OSes can directly issue DMAs using GPA, and the GPA will be translated to HPA by IOMMUautomatically.

QEMU-KVM

QEMU-KVM is a popular open-source hypervisor. KVM is a Linux kernel module that provides support for hardware-assisted virtualization. QEMU is a hypervisor on its own, running in the userspace. It can use KVM as its execution backend, delegating the virtualization of CPU and memory to KVM, and it handles the emulation of I/O devices.

2. Distributed Shared Memory

Distributed shared memory (DSM) provides a continuous virtual memory address space for applications that have no physically shared memory. In a DSM system, each CPU can use virtual addresses to access memory, without being aware of where the actual data locates. The research on DSM faces its first peak in the 1990s.

3. RDMA

Remote direct memory access (RDMA) is a network feature, and RDMA capable networks such as InfiniBand usually provide low latency and high throughput comparing to the traditional Ethernet and TCP/IP combination. The average latency of RDMA outperforms TCP by 9×. There are two groups of RDMA API, one-sided and two-sided. One-sided RDMA allows local CPUs to operate remote memory directly, without the involvement of remote CPUs. Two-sided RDMA is similar to traditional channel-style APIs such as the socket. One-sided RDMA usually has less latency than two-sided RDMA, but the opposite conclusion can be drawn when one transaction can be completed by either multiple one-sided operations or a single two-sided operation.

It is difficult for a single physical machine to satisfy applications which require massive resources such as big data analysis, while a virtual machine spanning multiple physical nodes can do it. In this application, a distributed QEMU is provided, which allows a guest OS running on single virtual machine to take advantage of resources (CPU, memory, I/O, etc.) from multiple physical nodes. QEMU is extended to enable forwarding of PIO, MMIO, Interrupts so that vCPUs and I/O devices on different machines can communicate with each other. Furthermore, in order to run a cross-node virtual machine, an RDMA-based distributed shared memory is implemented by extending the access control of EPT, which makes it possible for aggregating physical memory transparently.

Figure 2:
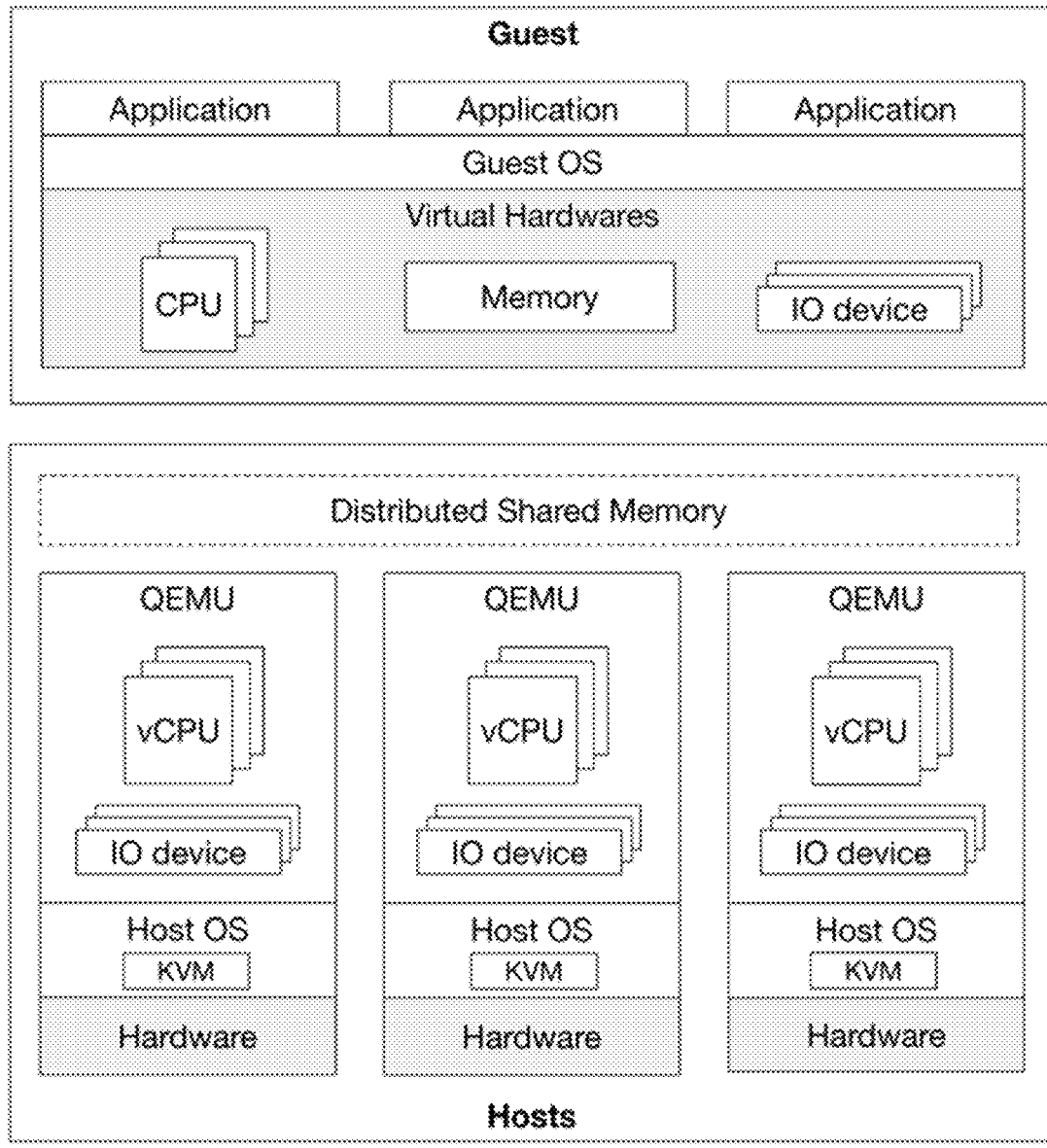
FIG. 2 is a block diagram of an embodiment of the architecture of GiantVM.

FIG. 2 is a block diagram of an embodiment of the architecture of GiantVM. Multiple hypervisors running on different physical machines are used to form a distributed hypervisor. To make this possible, several extensions are proposed to existing hypervisors, and the prototype implementation of GiantVM may be based on QEMU 2.8.1.1 and KVM (Linux kernel 4.9.76) on the x86 platform with around 5.8K lines of code.

To construct a distributed hypervisor, CPU, memory, and I/O is virtualized in a distributed way. For CPU and I/O, we added Interrupt and I/O Forwarding mechanisms to QEMU. For memory, a DSM module is implemented in KVM and QEMU is adapted for it. Besides, proper time synchronization is also implemented to make time-related functions like sleep work correctly.

To make multiple QEMU instances cooperate with each other to provide a single consistent view of virtualized hardware for the guest, local and remote resources are distinguished. That is, QEMUs on different physical machines all create a full virtual machine using the same parameters, but each with some hardware resources marked as remote and delegated to other QEMUs. From the view of QEMU, it just starts an ordinary VM, except that some resources are managed by remote QEMUs. An exception to this design is the memory, which is shared by all instances through the DSM in KVM.

Distributed vCPU

Firstly, QEMU is aware of the distinction between local and remote CPUs through command line parameters. For local vCPUs, they are treated as usual, with the exception that some instructions involving shared (i.e., memory) or remote resources are treated specially. For remote vCPUs, they are initialized but never started to run to provide dummy APICs (see below).

To achieve this, we add a flag to the data structure of vCPU state on QEMU, named local vCPU, to mark whether it is a local CPU. When each vCPU running on their thread, some judge logic are added: for a local vCPU, initialize its related data and allow it to enter the KVM by IOCTL as the normal way. For a remote vCPU, it will wait on a condition until it receives a request from the virtual machine or user so that the remote vCPU can be successfully destroyed. For the restart request, we reset the relevant status so that it can pass the check of QEMU and then run restarting operations successfully.

Once vCPUs are running, the next thing to consider is inter-processor interrupt (IPI), which only involves the interaction of vCPUs. On x86 architectures, there is an advanced programmable interrupt controller (APIC) in each core, which is responsible for accepting and delivering interrupts. It can be emulated in both KVM and QEMU, and it may be forced to reside in QEMU.

Figure 3:
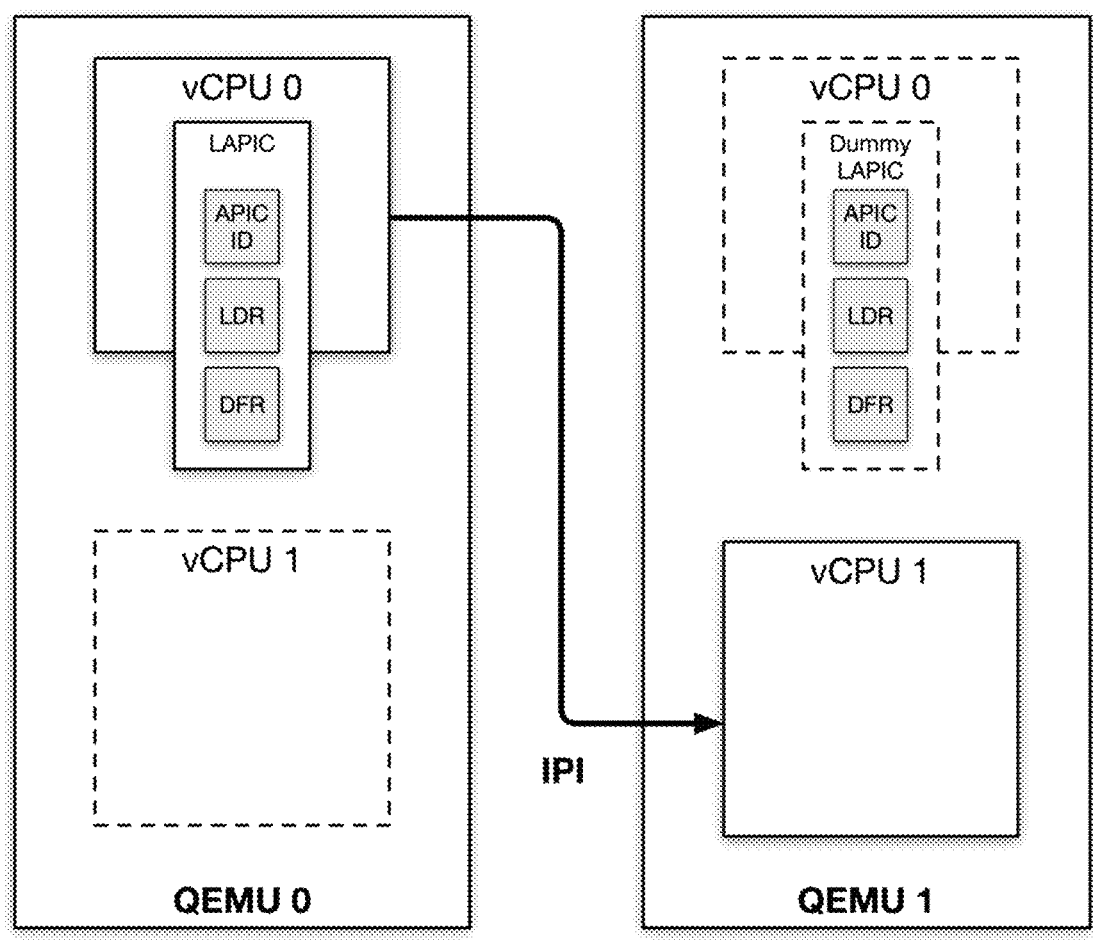
FIG. 3 shows an embodiment of IPI.

In short, an IPI forwarding mechanism is proposed. Its overall strategy is straightforward. A check is added at places that will issue an IPI. If the IPI is sent to local vCPU, then we just process it as usual; otherwise, we send it to remote QEMU and inject it into the APIC of remote vCPU. For example, vCPU 0 locating on QEMU 0 sends an IPI to vCPU 1 locating on QEMU 1, so QEMU 0 should forward this IPI to QEMU 1 as shown in FIG. 3.

The interrupts may be redefined and divided them into four categories:

Normal interrupt: We should forward the interrupt vector number and the triggers mode;

Special IPI(SMI/NMI/INIT) from vCPU to vCPU: We should forward the interrupt masks;

INIT Level De-assert interrupt: We should forward it alone but don't need to forward specific content;

EOI: LAPIC tells IOAPIC that the interrupt is completed by sending EOI, which needs to be forwarded to QEMU 0 which host the IOAPIC.

However, there is a detail of APIC that makes things more complicated. On x86 platforms, all IPIs (and actually all interrupts) are implemented as broadcast messages under the hood. Upon reception of an IPI message, the CPU uses three registers of APIC, namely APIC ID Register, LDR (Logical Destination Register) and DFR (Destination Format Register), along with the destination field of IPI message, to determine whether it is the destination of this IPI. In a distributed environment, as we cannot check the APIC of remote vCPUs before the IPI is sent to them, we initialize the remote vCPUs and their APICs locally.

Figure 4:
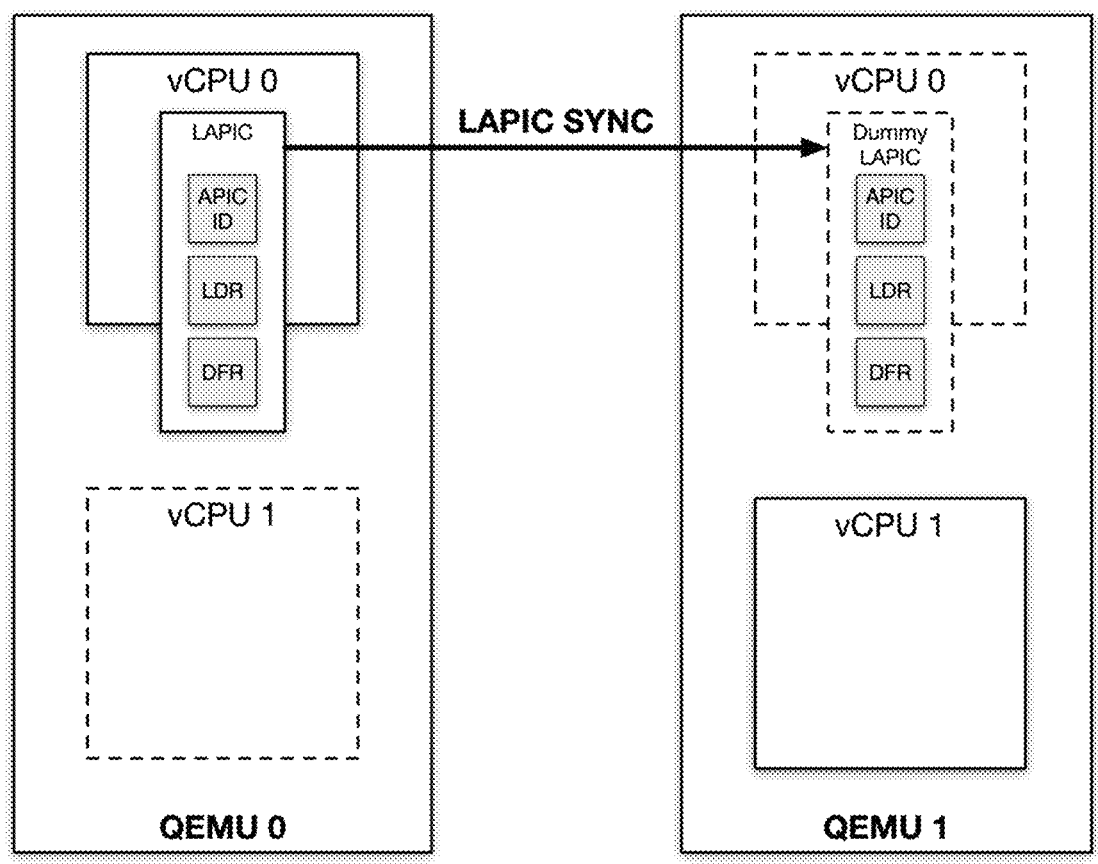
FIG. 4 shows an embodiment of LAPIC synchronization.
Figure 5:
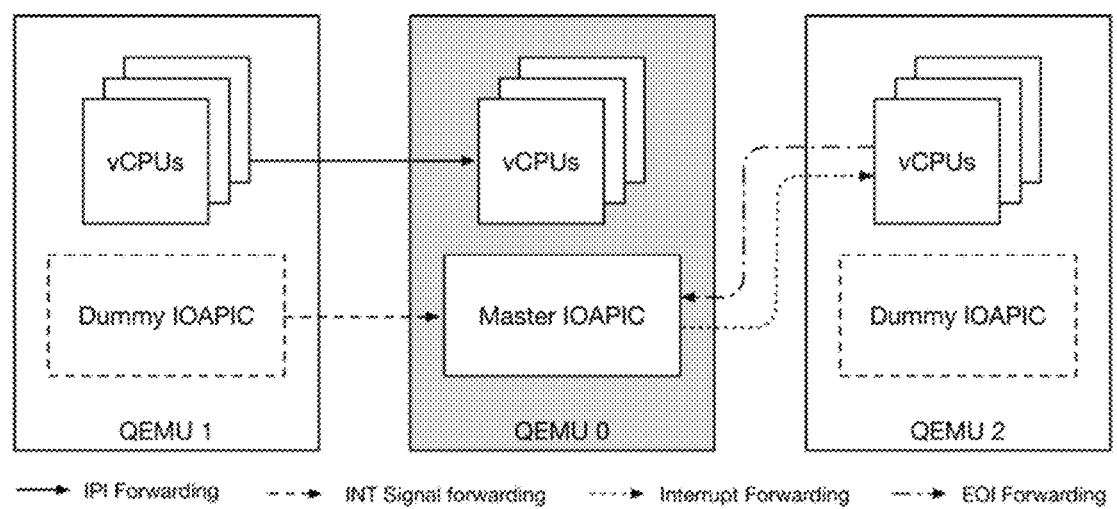
FIG. 5 shows an embodiment of interrupt forwarding.

FIG. 4 shows an embodiment of LAPIC synchronization. These APICs are dummy APICs, since their only purpose is to provide the three registers necessary for the decision of IPI destination. Whenever a local vCPU modifies one of the three registers, it will do a broadcast to make all dummy APICs in corresponding remote vCPUs up to date. This way, the target of an IPI can be determined and forwarded to remote vCPUs accordingly.

In addition to IPI forwarding, the interrupts sent from I/O devices to vCPUs also need to be forwarded if the vCPU and I/O devices are not located on the same machine.

On x86 platforms, there are two ways for devices to send an interrupt, that is, through IOAPIC or MSI. One important difference is that multiple legacy devices share one IOAPIC, while each modern PCI/PCIe device configures and generates interrupts on their own.

Figure 7:
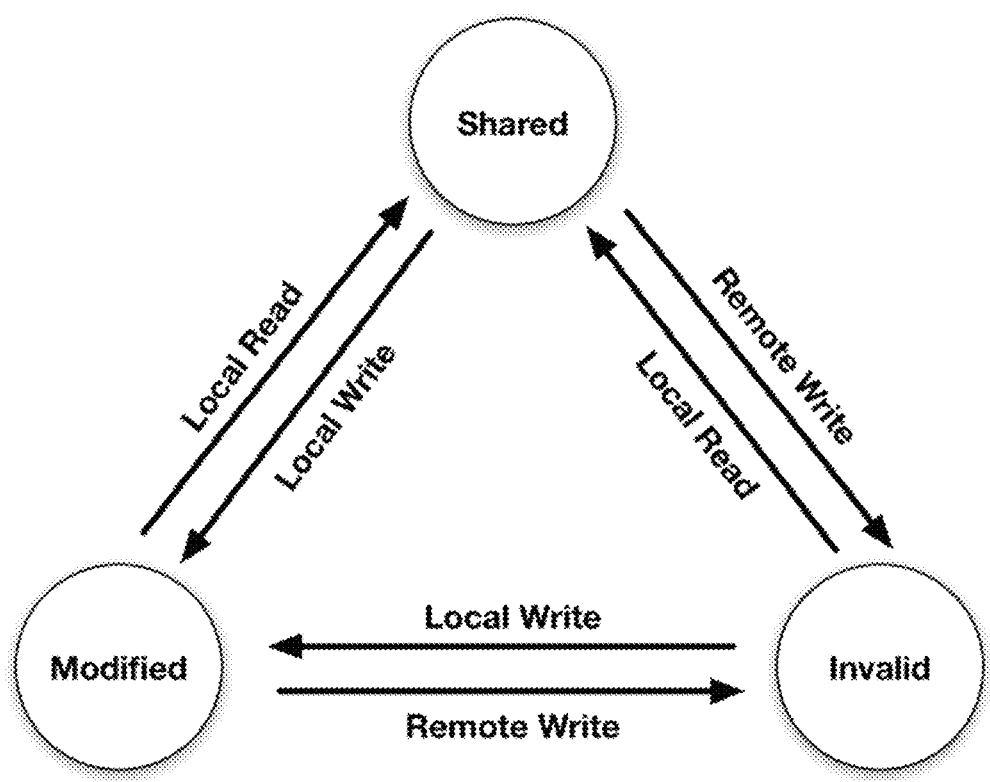
FIG. 7 shows the three states of the memory.

The interrupt forwarding process for IOAPIC is shown in FIG. 7. As there should only be one IOAPIC per system, one of the QEMUs is designated as master (shown as QEMU 0) and its IOAPIC is the master IOAPIC. Other QEMUs are slaves, and their IOAPICs are dummy IOAPICs. Since legacy devices need to inform the master IOAPIC through interrupt signals, dummy IOAPICs are initialized to collect those signals and forward them to the master IOAPIC. Reads and writes to registers of IOAPIC are all routed to master IOAPIC, so it contains all the necessary configurations and is capable of generating interrupts once the forwarded signals arrive. If the destination of a generated interrupt is remote vCPU, which can be determined through the help of dummy APICs, it is forwarded as described above for IPI forwarding. Also, IOAPIC requires an EOI (End of Interrupt) message from CPUs for certain interrupts, i.e., level-triggered interrupts, while MSI does not. So we also need to send the EOI back to the master IOAPIC from the target vCPU when necessary.

For MSIs, things are much simpler. If accesses to the configuration space of a device are properly forwarded as described below, the MSI of this device will be configured correctly. Then all we need is to forward the interrupt to remote vCPUs when an MSI is generated by this device.

Figure 6:
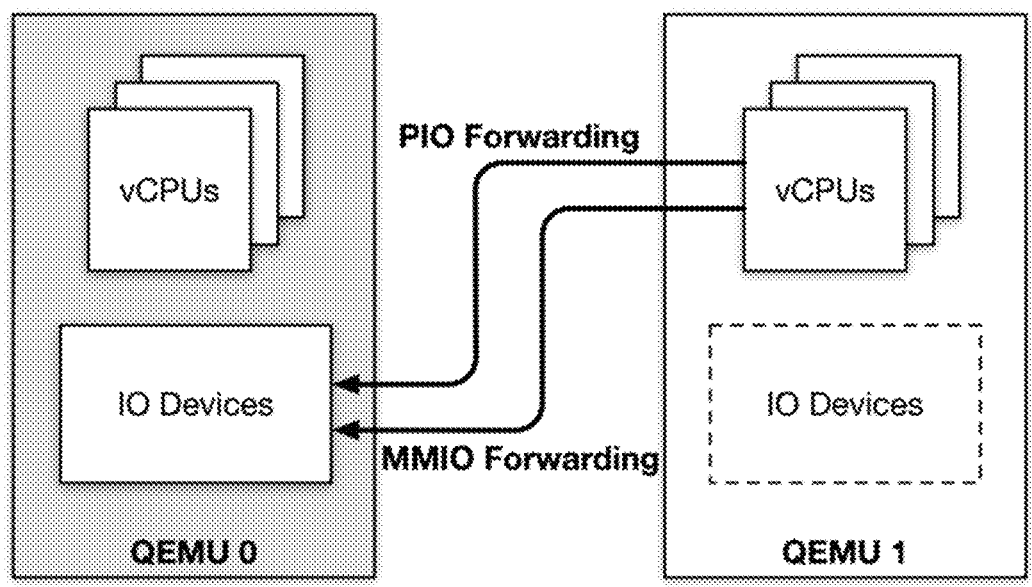
FIG. 6 shows an embodiment of I/O forwarding.

FIG. 6 shows an embodiment of I/O forwarding. Generally, I/O devices are accessed and programmed through memory mapped I/O (MMIO), while on x86 platforms there is an additional I/O address space that can only be accessed through special port I/O (PIO) instructions. Once the vCPU performs a PIO or MMIO, it will trap to KVM and then exit to QEMU if the PIO/MMIO cannot be handled in KVM (which is mostly the case, and devices emulated in KVM are not supported currently). When KVM exits due to a PIO/MMIO, we can add a check, and if the PIO/MMIO is to a remote device, it is forwarded to the remote node. After the access is processed on the remote side, a reply is sent back, and then we can finish this I/O access and return to guest mode again.

For PCI/PCIe devices, the situation is more complicated. Each device has its own configuration space which is accessed indirectly through the port 0xCF8 (address) and 0xCFC (data), and distinguish accesses to the configuration space of local and remote devices. Further, the MMIO memory region is dynamically configured through this configuration space, so we need to broadcast this configuration so that we can distinguish MMIOs to remote devices and illegal MMIOs.

In one embodiment of present invention, all devices are put under the master QEMU (i.e., QEMU 0), and all PIO/MMIO accesses are directed to the master QEMU, to simplify the complexity of I/O forwarding.

In order to implement the forwarding of interrupt/IO/KVMClock/Commands, we implemented the router module, which is responsible for listening requests from other QEMUs and processing them accordingly.

The basic design of routing is that each QEMU booting in distributed mode would create listener thread and listen to a specific port. When each distributed QEMU detects other QEMUs have started up, they would attempt to establish a connection. When the listener thread receives a connect request, it will open a new thread as a router to handle it specifically. The connector can then send a request to it through the connection, and the router will also send a response through it. Considering that each QEMU needs to be a sender and receiver at the same time, two full-duplex connections are established between each pair of QEMU.

The channel mechanism of QEMU is utilized in our implementation. We bind the socket to the channel in TCP implementation and bind QP to the channel in RDMA implementation. Since each of channel (read channel and write channel) could also bind to a QEMUfile, we could simply expose the QEMUfile to the upper layer. From the upper layer view, the request which is sent by other could be read from the QEMUfile directly, and the response could be sent by writing the QEMUfile which is corresponding to the write channel.

When QEMU handles the cross-CPU interrupt, it needs to get the sender of the interrupt through the per-thread variable current_cpu. To this end, when we forward the interrupt, we pack the CPU index of interrupt sender to the request. When the router receives a request, it will set the current_cpu of the router thread to the specified vCPU according to the CPU index, and the performs interrupt injection. At this point, the router thread becomes the remote agent of the sender vCPU, play a role to complete the interrupt on the QEMU of another machine. For non-type interrupts, we set the CPU index to CPU_INDEX_ANY to avoid changing current_cpu.

In order to speed up the forwarding, we also implement the RDMA version of the router based on the RDMA interface which is used for virtual machine migration originally. Just lick the TCP connection, we bind the channel (read channel and write channel) to different QEMUfile and only expose QEMUfile to upper layer.

One object of present invention is to aggregate resources of multiple machines, including memory, to create distributed shared memory (DSM). Distributed shared memory is responsible to provide consistent memory view for guest OS. Memories are usually organized as pages.

Each page has three kinds of state, namely Modified, Shared and Invalid, as shown in FIG. 7. If it is in Modified state, it has the exclusive ownership of this page and can read and writes at will. If it is in Shared state, it shares the page with other machines and is write protected. If it is in Invalid state, the page is marked not present in EPT and must ask other machines for the latest copy before any read or write can be done.

Figure 8:
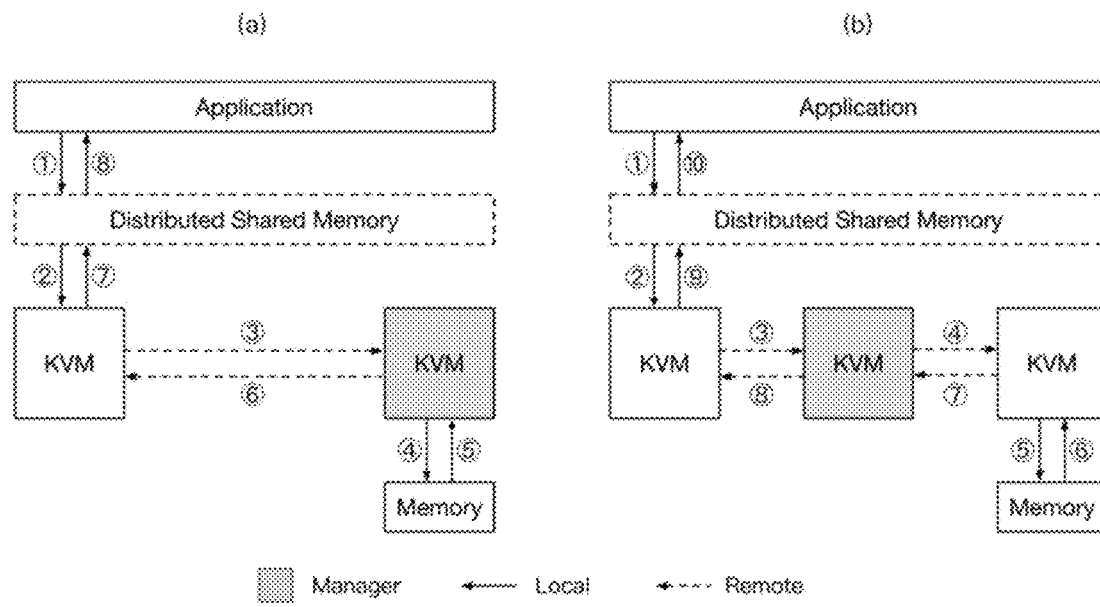
FIG. 8 is an embodiment of operations of DSM.

FIG. 8 is an embodiment of operations of DSM. The concept of owner for a page is introduced, which is the only one copy in Modified state, or the one maintaining a copy set for Shared copies of the page. KVMs may be designated as managers to track the owner of pages, each node is responsible for a portion of guest memory space, and this matches nicely with non-uniform memory architecture (NUMA).

FIG. 8(a) shows the situation that Manager is the owner, and FIG. 8(b) shows the situation that Manager is not the owner. When a read occurs on an Invalid page, or a write occurs on a Shared or Invalid page, a page fault is triggered, and the execution is transferred to the hypervisor, then a request to the manager of this page is issued, shown as step 1-3 in FIG. 8. The manager then forwards the request to the owner of this page, as shown in step 8 of FIG. 8 (*b*), or it processes the request immediately if it is already the owner, as shown in FIG. 8 (*a*). For read requests, the requesting node is added to the copyset of the owner and is sent the latest copy of this page. For write requests, the old owner invalidates all the holders of this page, and then transfer the ownership and the latest copy of this page to the requesting node. Those are illustrated as step 4-6/5-8 in FIG. 8(*a*)/(*b*) respectively. Finally, the hypervisor set the page table so that the guest will no longer page fault, and then transfer the control back to the guest, as shown in step 7-8/9-10 of FIG. 8(*a*)/(*b*).

Figure 9:
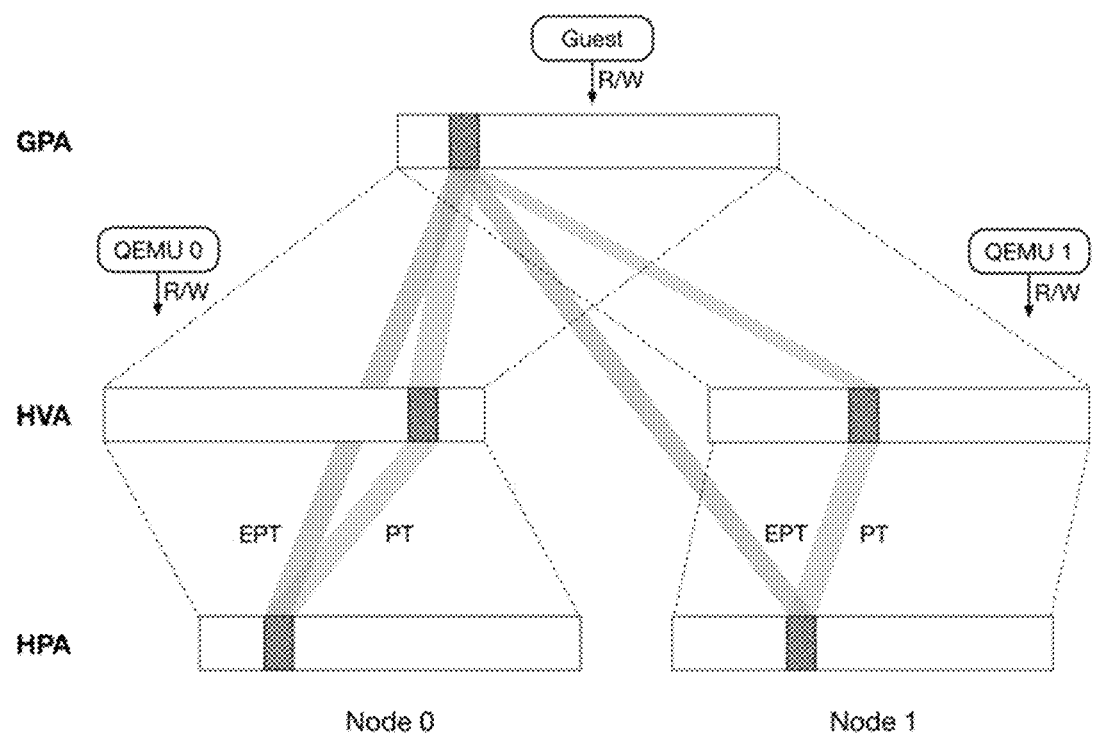
FIG. 9 shows an embodiment of the memory mapping in QEMU-KVM.

In the presence of hardware virtualization, the mapping of memory is not as simple as in traditional DSMs. FIG. 9 shows an embodiment of the memory mapping in QEMU-KVM. First, QEMU allocates the memory to be used by the guest in its address space, i.e., Host Virtual Address (HVA) space. Then it is registered to KVM, and KVM maintains the mapping between GPA and HVA. When guest accesses a memory location, it first uses page table to translate the GVA to GPA, then uses EPT to translate the GPA to HPA.

There are some important facts in this scheme: (1) The page table we use to write protect or invalidate a page is EPT, which controls the GPA-to-HPA mapping since it would be too intrusive to manipulate host page table directly. (2) The memory is allocated in HVA space, and for some devices, there are two MMIO memory regions in GPA space corresponding to the same memory region in HVA space, i.e., the HVA-to-GPA correspondence is a one-to-multiple mapping. (3) The only shared memory space between two nodes is the GPA space, so we can only use GPA in our DSM messages.

Taking these points into consideration, present application provides with the following design. The state and copyset are bound to pages in HVA space instead of pages in GPA space, to avoid inconsistent states for two guest pages mapping to the same host page. When a host page is invalidated, the entries of all corresponding guest pages are cleared in EPT. Similarly, when a host page enters Shared state, all the corresponding guest pages are write protected. Further, since we transfer GPA in DSM messages, GPA is translated back to HVA so that we can find the host page and its state. As KVM only tracks guest pages, necessary data structures for the tracking of host page status and the reverse mapping from host page to guest pages are added to KVM to support this design.

Additionally, the Dirty/Access bit support of EPT is disabled in the implementation. When this feature is enabled, any access to the guest page table, including page walks performed by hardware, is considered by EPT as a write when the GPA to HPA translation happens. The resultant write faults will cause disastrous page thrashing and ruin the performance, so this feature is intentionally disabled.

With the help of permission bits in EPT, all the accesses from guests to Shared and Invalid pages can be trapped. However, as the memory of guests is actually allocated in HVA space, QEMU and KVM can manipulate it directly without involving the translation provided by EPT.

To solve this problem, two operations may be added, pin and unpin, to the DSM. When a page is pinned, it may be transferred into the desired state, i.e., Shared or Modified, according to the protocol of DSM, and then block all the incoming requests on this page, until an unpin on the same page is performed. For accesses within KVM, we just use these internal operations to protect the accessed memory. For accesses in QEMU, we expose the operations through an IOCTL called MEMPIN, which can do both pin and unpin on a host memory region. Then we can protect those accesses using the MEMPIN IOCTL.

There is still another type of memory access, namely DMA, that bypasses EPT. DMAs are performed directly on HPA, so they are not affected by EPT. DMA to guest memory generally happens when a device is passed through to the guest and is usually protected by IOMMU in modern practices. Unfortunately, IOMMU lacks a page fault like mechanism, so we cannot use it in the same way as EPT. Currently, the only possible solution is to pin the guest memory involved in the DMA before it is issued and unpin the memory after it is done.

The virtualization of time has always been considered a hard problem, and it becomes worse in distributed environments since clocks on different nodes can be out of sync, and time-related functions like gettimeofday and sleep will misbehave consequently.

To make sure different nodes are in sync, two things may be taken into consideration: TSC (Time Stamp Counter) and kvmclock.

TSC is a register on x86 architectures, which increases at a constant rate continuously and thus can be used as a clock source providing elapsed time. VT-x provides features called TSC offsetting and TSC scaling to adjust the value of TSC read by guest vCPU, which gives: guest_tsc=host_tsc*scale_ratio+offset To make sure TSC values seen by vCPUs are in sync, the first started QEMU may be designated as the master, from which others will query the rate and value of TSC, derive the appropriate scale_ratio and offset, and then set them through KVM.

Figure 10:
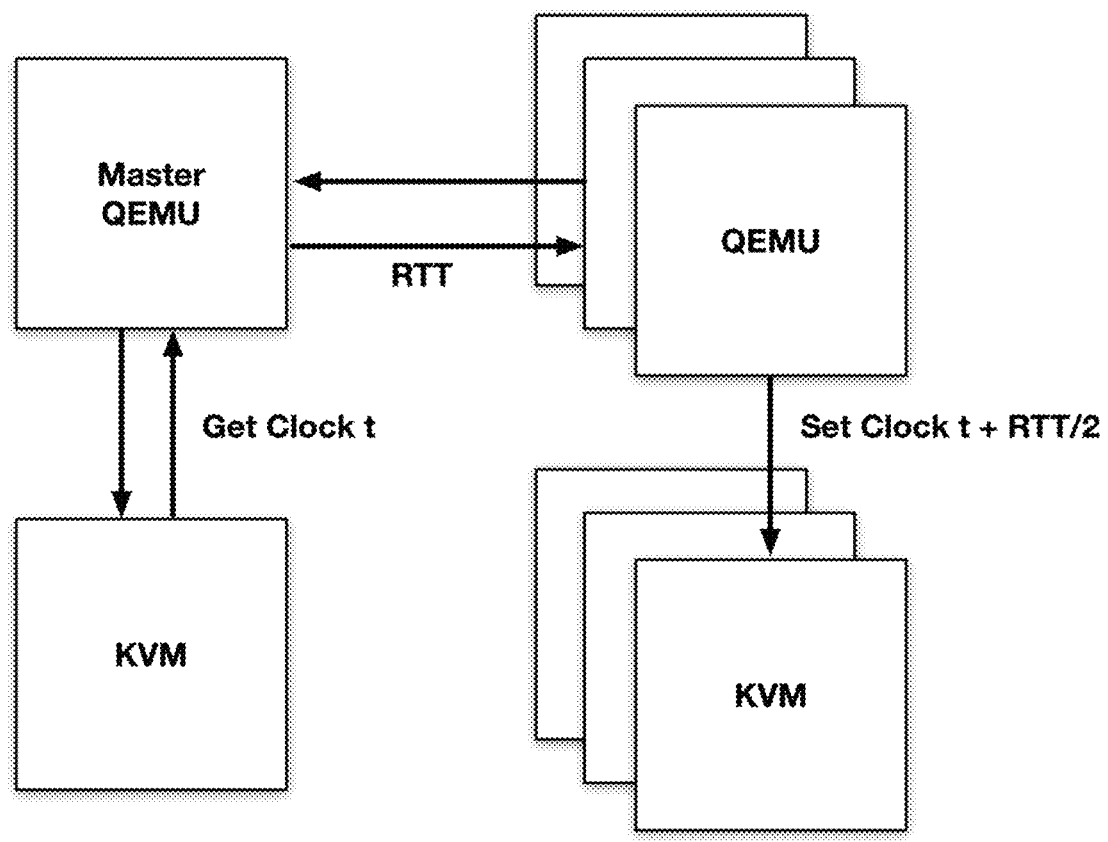
FIG. 10 shows an embodiment of implementing time synchronization by Kvmclock.

FIG. 10 shows an embodiment of implementing time synchronization by Kvmclock. Kvmclock is a para-virtualized clock source maintained by KVM running at a fixed rate of 1 GHz and is used as the primary clock source by guest OSes if enabled. The following formula gives the read value of kvmclock at time t: kvmclock(t)=host_boot_time($t_0$)+offset+(guest_tsc(t)−guest_tsc($t_0$))/guest_tsc_rate In which host_boot_time($t_0$) (time elapsed since boot on the host) and guest_tsc($t_0$) are updated periodically by KVM, guest_tsc(t) is read directly by guest vCPU at time t, and offset is a user-provided adjustment. To be precise, one cannot set offset directly, and can only get and set the value of kvmclock through KVM.

As the host_boot_time(t) on different nodes differs from each other, an appropriate offset must be provided to keep the kvmclock read value on different vCPUs in sync. Fortunately, QEMU sets the kvmclock upon startup to make it start from 0. This process is modified to let slave QEMUs query the master QEMU for its kvmclock value and apply it to themselves upon startup so that all vCPUs will see the same kvmclock value.

In both the TSC and kvmclock case, we also take round-trip time (RTT) of the query into consideration, and the time we used for slaves is actually: slave_time=master_time+RTT/2

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A method for resource aggregation (many-to-one virtualization), comprising:
   virtualizing central processing unit (CPU) by quick emulator (QEMU) in a distributed way;
   organizing a plurality of memories scattered over different machines as pages to providing consistent memory view for guest operating system (OS);
   performing time synchronization between different machines; and
   maintaining state and copyset information of pages in host virtual address (HVA) space instead of guest physical address (GPA) space, to avoid inconsistent states for two guest pages mapping to a same host page.

2. The method of claim 1, virtualizing CPU by QEMU in a distributed way comprising:
   creating by QEMU a full amount of vCPUs and dividing into local vCPU and remote vCPU;
   initializing the remote vCPUs but never starting to run to provide dummy advanced programmable interrupt controller (APIC) having three special registers; and
   upon reception of an inter-processor interrupt (IPI) message, used by the CPUs the three special registers of the APIC along with a destination field of IPI message, to determine whether it is a destination of this IPI.

3. The method of claim 2, virtualizing CPU by QEMU in a distributed way comprising:
   adding a flag to a data structure of local vCPU, to mark whether it is a local CPU.

4. The method of claim 2, further comprising:
   forwarding interrupts sent from input/output (I/O) devices to vCPUs through IOAPIC or medium scale integration (MSI) if the vCPU and the I/O devices are not located on a same machine.

5. The method system of claim 1, further comprising:
   creating, by each QEMU booting in distributed mode, listener thread and listening to a specific port, when each distributed QEMU detects other QEMUs have started up, the distributed QEMU attempts to establish a connection, and when the listener thread receives a connect request, the distributed QEMU opens a new thread as a router for a specific handling.

6. The method of claim 1, wherein each page has three kinds of state, Modified, Shared and Invalid,
   in Modified state, the page is read and written at will;
   in Shared state, the page is shared and write protected;
   in Invalid state, the page is marked not present in extended page table (EPT), and must ask other machines for a latest copy before any read or write is done.

7. The method of claim 1, wherein when a host page is invalidated, entries of all corresponding guest pages is cleared in extended page table (EPT).

8. The method of claim 1, wherein when a host page enters Shared state, all corresponding guest pages is set to write protected.

9. The method of claim 1, wherein performing time synchronization between different machines further comprises:
   using Time Stamp Counter (TSC) as a clock source providing elapsed time;
   designating a first started QEMU as a master;
   querying by rest QEMU from the master a rate and a value of TSC;
   deriving an appropriate scale_ratio and offset, and then setting them through KVM to adjust the value of TSC read by guest vCPU.

10. The method of claim 9, wherein performing time synchronization between different machines further comprises:
    using Kvmclock as a clock source by guest Oses;
    setting by a master QEMU the kvmclock upon startup to make it start from 0;
    querying by the rest QEMUs the master QEMU for a kvmclock value and apply the kvmclock value to the rest QEMUs upon startup so that all vCPUs see a same kvmclock value.

11. A GiantVM system for resource aggregation, comprising:
    a plurality of distributed quick emulators (QEMUs), cooperating with each other to provide a single consistent view of virtualized hardware for a guest, wherein:
       each QEMU comprises a full amount of vCPUs which are divided into local vCPU and remote vCPU, wherein the local vCPU refers to a vCPU running on a local machine, while the remote vCPU refers to a vCPU running on other physical machines;
    I/O devices being accessed and programmed through memory-mapped I/O (MMIO) MMIO; and
    a distributed shared memory comprising a plurality of memories scattered over different machines, and providing consistent memory view for guest OS.

12. The GiantVM system of claim 11, wherein the remote vCPUs are initialized but never started to run to provide dummy advanced programmable interrupt controller (APIC) having three special registers, upon reception of an inter-processor interrupt (IPI) message, the CPU uses the three special registers of the APIC along with a destination field of IPI message, to determine whether it is a destination of this IPI.

13. The GiantVM system of claim 11, wherein interrupts sent from input/output (I/O) devices to vCPUs are forwarded through IOAPIC or medium scale integration (MSI) if the vCPU and the I/O devices are not located on a same machine.

14. The GiantVM system of claim 11, wherein the plurality of memories is organized as pages, with each page having three kinds of state, Modified, Shared and Invalid,
    in Modified state, the page is read and written at will;
    in Shared state, the page is shared and write protected;
    in Invalid state, the page is marked not present in extended page table (EPT) and must ask other machines for a latest copy before any read or write is done.

15. The GiantVM system of claim 11, wherein QEMU is to allocate the memory to be used by the guest in Host Virtual Address (HVA) space which is registered to KVM which maintains a mapping between guest physical address (GPA) and HVA, when the guest accesses a memory location, it first uses page table to translate the GVA to GPA, then uses EPT to translate the GPA to host physical address (HPA).

16. The GiantVM system of claim 11, further comprising:
    owners of pages, each of which maintains a copyset of a page; and
    managers to track the owner of pages,
    when a read occurs on an Invalid page, or a write occurs on a Shared or Invalid page, a page fault is triggered, and execution is transferred to KVM, then a request to the manager of this page is issued, the manager then forwards the request to the owner of this page, or it processes the request immediately if it is already the owner.

17. The GiantVM system of claim 11, further comprising:
a router module, which is responsible for listening requests from other QEMUs and processing them.

18. The GiantVM system of claim 17, wherein each QEMU booting in distributed mode is to create listener thread and listen to a specific port, when each distributed QEMU detects other QEMUs have started up, the distributed QEMU is configured to attempt to establish a connection, and when the listener thread receives a connect request, the distributed QEMU is configured to open a new thread as a router for a specific handling.

* * * * *